March 10, 1970   F. G. MORITZ   3,500,163
MOTOR CONTROL CIRCUIT
Filed March 2, 1967   2 Sheets-Sheet 1
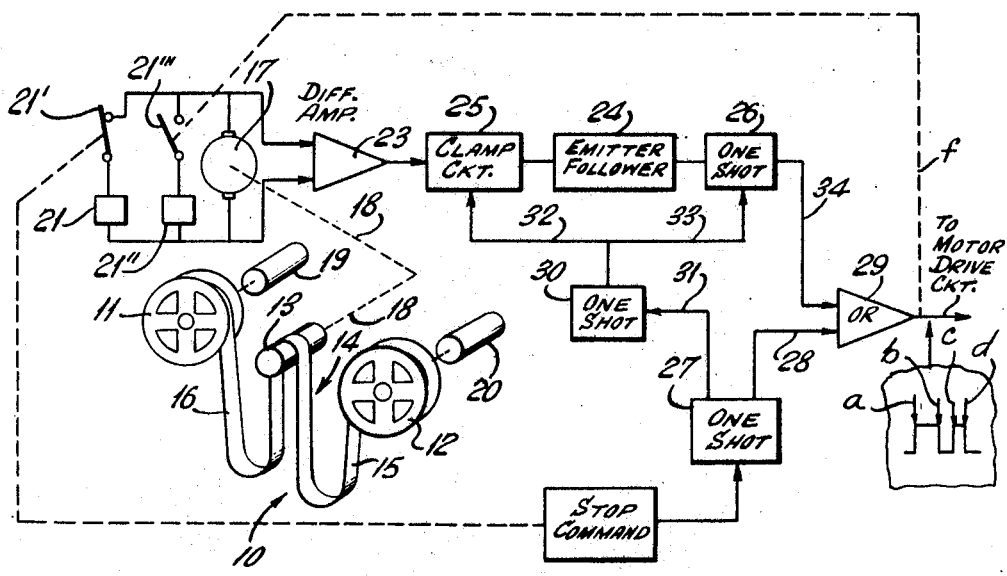
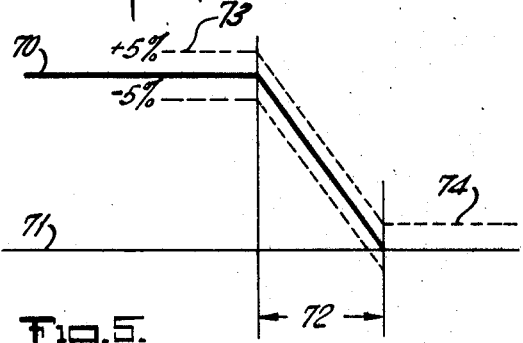
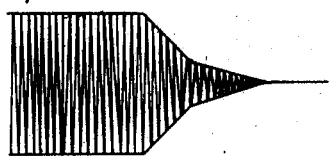
INVENTOR
FREDERICK G. MORITZ

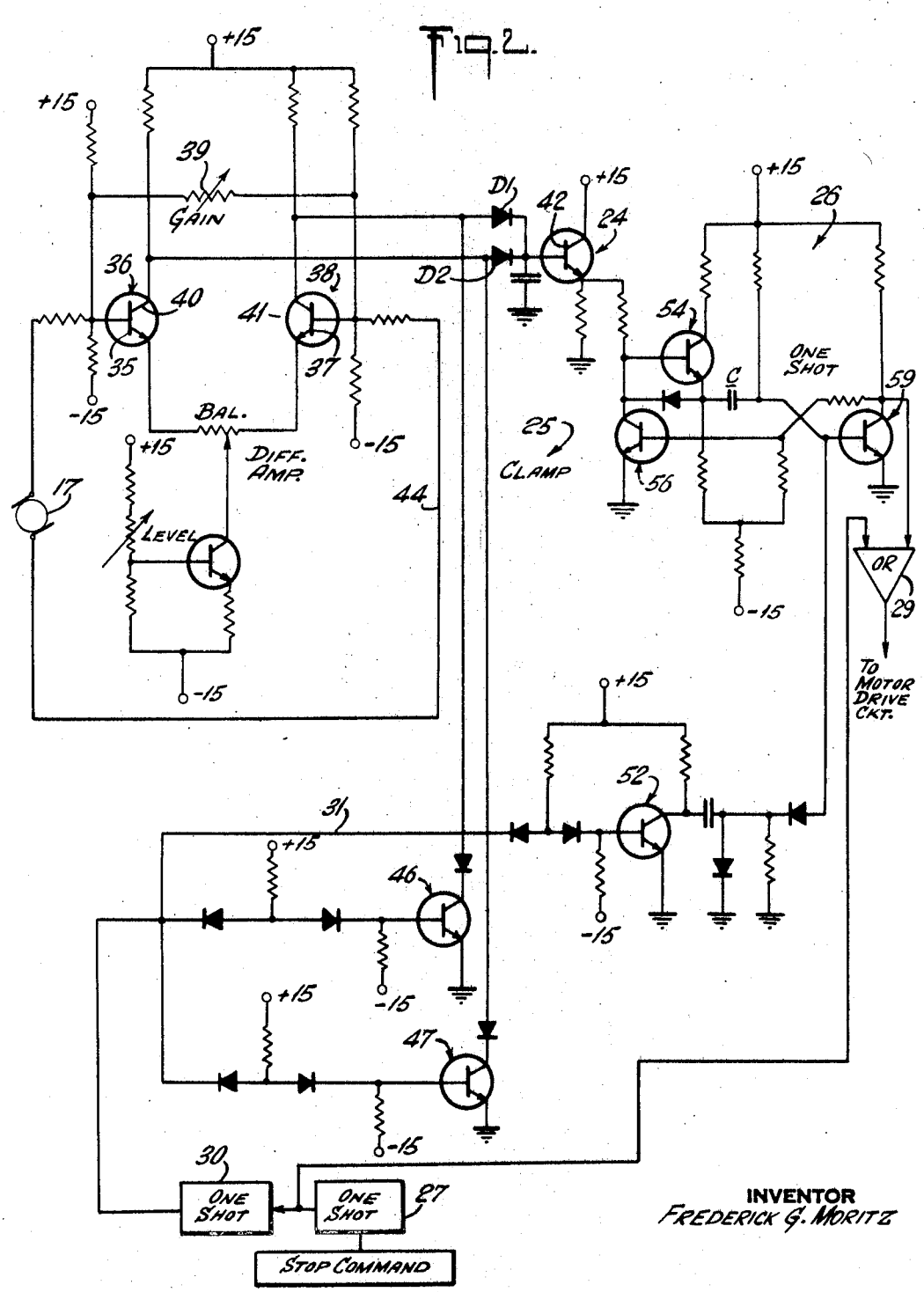

United States Patent Office 3,500,163
Patented Mar. 10, 1970

3,500,163
MOTOR CONTROL CIRCUIT
Frederick G. Moritz, Hauppauge, N.Y., assignor to Potter Instrument Company, Inc., Plainview, N.Y., a corporation of New York
Filed Mar. 2, 1967, Ser. No. 620,097
Int. Cl. H02p 3/10
U.S. Cl. 318—373                    3 Claims

ABSTRACT OF THE DISCLOSURE

In a magnetic tape transport, the tape driving motor is started and stopped by the application of a current pulse. In stopping the motor, a signal proportional to the motor speed is used to charge the timing capacitor of a monostable multivibrator which determines the pulse width of the current pulse used to bring the motor to a final stop.

---

The present invention, generally, relates to tape handler apparatus and, more particularly, to a new and improved circuit for controlling the deceleration of the capstan drive motor in such tape handler apparatus.

It has been found in operating tape handler apparatus at speeds above 75 inches per second that a capstan drive motor of the printed circuit type may operate entirely satisfactorily. Usually such a printed circuit motor is capable of maintaining a speed within plus or minus 5% of a predetermined speed when operating from a voltage source having sufficient capacity.

A tape handler apparatus usually must start and stop the motion of the tape within a few milliseconds, and therefore, it is extremely important that the acceleration time and the deceleration time be controlled accurately to maintain the desired start-stop action of the apparatus. During acceleration, a constant current may be applied to the motor for a fixed interval calculated to bring the speed of the motor up to within plus or minus 5% of a desired operating speed. Then, the motor drive circuit may be switched to a constant voltage source which serves to "pull in" the motor to precisely the desired speed.

However, a problem arises in attempting to stop the motor within a predetermined time interval. This problem arises because of several variables that affect motor speed directly. For example, a motor will require different stopping forces for different loads connected with the shaft. A different stopping force is also required for different speeds at which the motor may be running at the instant a stop signal is given, since the motor speed is permitted a given variation in speed, such as plus or minus 5%. Therefore, it is not practical to set a value for a deceleration current to bring the motor speed down to zero (or to some other desired speed) within the predetermined time interval.

Accordingly, it is a principal object of the present invention to provide a new and improved motor deceleration control circuit for reducing the speed of a motor to a predetermined speed within a predetermined interval of time.

It is also an object of the invention to provide a deceleration circuit for controlling a motor, independent of other variables.

A further object of the invention is to provide a new and improved deceleration control circuit for use with a printed circuit motor to stop the motor within a predetermined interval of time.

A still further object of the invention is to provide a deceleration control circuit for reducing the speed of a printed circuit motor to a predetermined speed from an initial speed that may have plus or minus variations within preselected tolerances.

Briefly, a motor deceleration control circuit, in accordance with the present invention contemplates plugging the motor for a predetermined interval and thereafter sampling the back electromotive force (back E.M.F.) generated by its rotating armature. The motor is thereafter again plugged for an interval determined by a monostable multivibrator whose output pulse width is a function of the magnitude of the sampled back E.M.F.

The invention further resides in certain novel features of parts and further objects and advantages thereof will become apparent to those skilled in the art to which it pertains from the following description of the preferred embodiment described with respect to accompanying drawings in which similar reference characters represent corresponding parts in the several views, in which:

FIGURE 1 is a diagrammatic illustration of the logic circuit in accordance with the present invention;

FIGURE 2 is a schematic circuit diagram illustrating the interconnection of various circuit components to accomplish the logic of the diagram shown in FIGURE 1;

FIGURE 3 is a curve showing the deceleration curve for a motor with predetermined design tolerances;

FIGURE 4 is a deceleration envelope as it would appear on the screen of an oscilloscope for a motor decelerating in a desired manner;

FIGURE 5 is a deceleration envelope similar to FIGURE 4 but showing a deceleration speed that undershoots a desired final motor speed; and FIGURE 6 is a deceleration envelope similar to FIGURE 4 but showing a deceleration speed that overshoots a desired final motor speed.

Referring now to FIGURE 1 of the drawings, a tape handler 10 includes two reels 11 and 12, or any other suitable tape storage means, and a tape drive capstan 13. An information storage tape 14, such as perforated or magnetic tape, is formed into two loops 15 and 16 to provide the usual temporary storage means at is well known in the art.

To drive the tape 14, the rotatable capstan 13 is connected to a suitable low inertia motor 17 indicated schematically by the broken line 18. A so-called printed circuit motor which has a permanent magnetic field is one example of a suitable motor. To assist in maintaining tension in the tape 14 as near as possible to a preselected value, each of the reels is rotated by servo motors 19 and 20, respectively.

The armature 17 of the capstan drive motor is connected to a source of direct current (D.C.) energizing current 21 via a normally closed switch 21', and to a source of current 21'' via a switch 21'''. It should be noted that sources 21 and 21'' are respectively of opposite potential and that switches 21' and 21''' may be suitable electronic switches known in the art, such as transistor switches. When the motor is driving the capstan 13, switch 21' is closed and switch 21''' is open. Upon receipt of a stop command signal from a suitable source such as a computer or a manually operated push button, switch 21' is opened, indicated schematically by the dotted line g, and switch 21''' is closed in a manner which will be described more fully hereinafter.

The armature of the capstan drive motor 17 is connected to a differential amplifier 23 which amplifies the back E.M.F. (of either polarity); diodes $D_1$ and $D_2$ couple a positive signal to an emitter follower circuit 24 through a clamp circuit 25. The clamp circuit maintains the voltage input to the emitter follower circuit 24 at a preselected value when the motor is energized. When D.C. energizing source 21 hereinafter called drive circuit 21 is deenergized to permit sensing the back E.M.F., the clamp is removed and the voltage level at the emitter follower input quickly will be representative of the back E.M.F. voltage. In the preferred arrangement, the voltage maintained by the clamp is zero.

It is contemplated that a simple motor drive circuit 21 may include suitable means to "drive" the motor 17 in the reverse, as well as in the forward, direction. In other words, a single bipolar drive circuit 21 may be used as the decelerate as well as the accelerate control for the motor 17. Separate circuits have been shown in FIGURE 1 in order to clarify the disclosure.

In stopping the motor 17, an initial stopping pulse of current is applied to the armature 17 by the circuit 21″ in response to a stop command, which command is timed by well known circuits (not shown). This stopping current pulse is advantageously applied over a period of time approximately equal to 80% of the total time to stop the motor. Such an initial stopping pulse is illlustrated by the pulse $a$–$b$ in FIGURE 1.

At the end of the initial stopping pulse, no energizing potential is coupled to the motor armature 17, and it coasts. The clamp circuit 25 at this time permits the back E.M.F., which is generated by the coasting motor 17, to be applied to the emitter follower circuit 24. The output of the emitter follower 24 charges the timing capacitor of a multivibrator 26 to a potential which is a function of the magnitude of the motor back E.M.F. and hence the motor speed. It will be appreciated that the duration of an output pulse form multivibrator 26 is a function of the back E.M.F. generated by the motor.

The interval of time that the armature 17 is rotating freely may be referred to as a "sampling" period or interval, or a "back E.M.F. sensing interval." The sampling interval is indicated by the time $b$–$c$ in FIGURE 1, and the final, stopping current pulse interval is indicated by $c$–$d$.

A tape handler apparatus usually requires the tape to be driven in a rapid start-stop, repetitive cycle. Since the present invention relates particularly to the stop portion of this cycle, only that logic circuitry is illustrated. For example, in its properly timed sequence, which is predetermined by circuit design in the usual manner, the output of a multivibrator circuit 27 provides the timing for the initial pulse of stopping current $a$–$b$. This output coupled through an OR gate 29 in order to close switch 21‴, as indicated schematically by the dotted line $f$.

The multivibrator circuit 27 resets at the end of the time interval represented by the pulse $a$–$b$, automatically by its own circuit design, and the trailing edge of the pulse $a$–$b$ triggers another multivibrator circuit 30 over a connection 31. The clamp circuit 25 is "opened" (its bias voltage is removed) by a signal over a connection 32, in response to the triggering of the multivibrator circuit 30. At the end of a delay equal to the time interval $b$–$c$ as determined by the design of the circuit 30, a pulse of current $c$–$d$ is delivered over a connection 34, through the OR gate 29, to the switch 21‴, closing this switch.

Although it is believed that one skilled in the art to which the invention pertains could build and operate a motor deceleration control circuit from the above description taken together with the circuit logic illustrated in FIGURE 1 of the drawings, still further details of the control circuit are illustrated in FIGURE 2.

Referring now to FIGURE 2, the same reference numerals are used to designate the same component parts shown in FIGURE 1. One side of the armature is connected to the base 35 of a transistor 36 and the other side to the base 37 of another transistor 38. The gain of the differential amplifier comprising transistors 36 and 37 is adjustable by a potentiometer 39 in the usual manner.

Two diodes D1 and D2 permit the positive going voltage, whether from collector 40 or from collector 41 of the transistors 36 and 38, respectively, to be applied to the base 42 of a transistor 24 connected in an emitter follow configuration. Transistors 46 and 47 clamp or maintain diodes D1 and D2 at ground potential when the armature 17 is energized. It will be appreciated that transistors 46 and 47 are normally conducting and an output pulse from monostable multivibrator 30 cuts them off. Similarly, a transistor 52, which is also coupled to the output of monostable multivibrator 30, is cut off by an output pulse from this monostable multivibrator.

During a sampling interval, the input to transistor 24 is unclamped, and its output is coupled to the timing capacitor C of monostable multivibrator 26 via transistor 54. Monostable multivibrator 26 comprises transistors 56 and 59 arranged that in its quiescent state transistor 59 conducts and transistor 56 is cut off. As will be appreciated by those skilled in the art, the interval that multivibrator 26 remains in its unstable state following a trigger pulse (which is applied from transistor 52 to the base of transistor 59) is a function of the charge accumulated by capacitor C. This charge, in turn, is a function of the back E.M.F. of armature 17, since the sampling interval is constant.

In operation, a stop command opens switch 21′ and triggers multivibrator 27. The output of multivibrator 27 closes switch 21‴ for a certain interval during which the motor is decelerated about 80% by means of the application of a plugging current from source 21″, which is of opposite polarity to source 21′.

At the trailing edge of the output of multivibrator 27, switch 21‴ opens and monostable multivibrator 30 is triggered, providing an output pulse which cuts off transistors 46, 47 and 52. During the interval during which multivibrator 30 its in its unstable state, timing capacitor C of monostable multivibrator acquires a charge which is a function of the back E.M.F. generated by armature 17. The trailing edge of the output pulse of multivibrator 30 triggers multivibrator 26 via transistor 52. During the interval multivibrator 26 is in its unstable state, its output coupled via OR gate 29 closes switch 21‴. By properly adjusting the circuit parameters, at the end of this second variable interval $c$–$d$, the motor may be decelerated to zero speed irrespective of the motor speed at the end of the initial decelerating interval $a$–$b$.

To illustrate in more detail what is referred to as undershoot and overshoot as related to the deceleration of the motor to the desired speed, which is zero in this case, reference is made to FIGURE 3 of the drawings. A curve 70 represents the speed of the motor when it is turning at the desired revolutions per minute, and the two dash lines represent the range of variation from the desired speed that can be tolerated and that can be anticipated because of other variables.

If a stop command signal has a preset width calculated on the basis of the curve 70 to bring the motor speed down to the line 71 within the interval of time 72, but at the instant the signal is applied the motor is turning at a speed represented by the line 73, then when the stop command signal is ended, the motor will be still turning at a speed represented by the line 74. A similar situation may occur if the motor is turning at −5% of the desired speed or, for that matter, at any speed other than the particular speed for which the stop signal width is calculated and preset.

The curve shown in FIGURE 4 of the drawings represents the envelope of the motor speed as it would appear on an oscillograph screen for the speed being reduced exactly to zero. On the other hand, the envelope as it appears in FIGURE 5 represents the case where the stopping current pulse is ended while the motor is still turning, and then, the motor coasts to a stop. In FIGURE 6, it is illustrated what occurs when the stop command signal is too long, and the motor begins to rotate in the reverse direction before the signal is ended. These curves show more clearly the real need for a means to relate the width (or duration) of the stop command signal to the actual (or real) value of the motor speed. The present invention provides this means.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A motor control circuit for stopping a motor within a first predetermined interval of time, comprising in combination:

a direct current electric motor having a rotatable output shaft, a first electrical circuit for energizing said motor with a current of one polarity so that said shaft rotates approximately at a constant predetermined speed, a second electrical circuit for energizing said motor with a current of opposite polarity, a third electrical circuit responsive to a stop command for coupling said second electrical circuit to said motor for a second predetermined interval that exceeds 50 percent of said first predetermined interval, whereby said rotating shaft experiences continuous decelerating force during said second predetermined interval, and a fourth electrical circuit responsive to the back E.M.F. generated by said motor for coupling said second electrical circuit to said motor for at least one additional interval whose duration is a function of the back E.M.F. in order to decelerate the motor to zero speed.

2. A motor control circuit as in claim 1 wherein said second interval is approximately 80 percent of said first interval.

3. A motor control circuit as in claim 2 wherein said motor is a low inertia motor and said shaft is directly coupled to a low inertia capstan for driving magnetic tapes.

References Cited

UNITED STATES PATENTS

| 2,905,876 | 9/1959 | Hillman | 318—331 |
| 3,027,505 | 3/1962 | Auld | 318—331 |
| 3,293,524 | 12/1966 | Parrish | 318—331 |
| 3,105,181 | 9/1963 | Sanborn | 318—369 |
| 3,260,911 | 7/1966 | Rasmussen | 318—373 |
| 3,344,328 | 9/1967 | Morris | 318—269 |
| 3,375,425 | 3/1968 | Bell | 318—302 |

ORIS L. RADER, Primary Examiner

K. L. CROSSON, Assistant Examiner

U.S. Cl. X.R.

318—397, 416